United States Patent
Garcia et al.

(10) Patent No.: US 9,033,073 B2
(45) Date of Patent: May 19, 2015

(54) PROSTHETIC AID

(71) Applicants: Ninfa Garcia, Loma Linda, CA (US);
Wilfredo Garcia, Loma Linda, CA (US)

(72) Inventors: Ninfa Garcia, Loma Linda, CA (US);
Wilfredo Garcia, Loma Linda, CA (US)

( * ) Notice: Subject to any disclaimer, the term of this patent is extended or adjusted under 35 U.S.C. 154(b) by 0 days.

(21) Appl. No.: 13/888,182

(22) Filed: May 6, 2013

(65) Prior Publication Data

US 2013/0306386 A1    Nov. 21, 2013

Related U.S. Application Data

(60) Provisional application No. 61/688,185, filed on May 9, 2012.

(51) Int. Cl.
| | | |
|---|---|---|
| A61G 5/04 | (2013.01) | |
| A61G 5/14 | (2006.01) | |
| B60K 1/04 | (2006.01) | |
| A61G 5/10 | (2006.01) | |

(52) U.S. Cl.
CPC ... B60K 1/04 (2013.01); A61G 5/04 (2013.01); A61G 5/1043 (2013.01); A61G 2203/14 (2013.01); Y10S 180/907 (2013.01); Y10S 180/908 (2013.01)

(58) Field of Classification Search
CPC . A61G 3/00; A61G 2005/00; A61G 2005/10; A61G 2200/36; A61G 5/12; A61G 7/1096; A61G 5/1072; Y10S 297/04
USPC ............................................ 180/907, 908, 21
See application file for complete search history.

(56) References Cited

U.S. PATENT DOCUMENTS

| | | | |
|---|---|---|---|
| 4,547,913 A | 10/1985 | Phillips | |
| 4,613,151 A * | 9/1986 | Kielczewski | 280/650 |
| 5,222,567 A * | 6/1993 | Broadhead et al. | 180/15 |
| 5,249,636 A * | 10/1993 | Kruse et al. | 180/21 |
| 5,690,185 A * | 11/1997 | Sengel | 180/65.1 |
| 6,436,149 B1 | 8/2002 | Rincoe | |
| 6,652,596 B2 | 11/2003 | Smith et al. | |
| 7,083,019 B2 * | 8/2006 | Chiou et al. | 180/65.1 |
| 8,302,221 B1 * | 11/2012 | Camp, Jr. | 5/81.1 RP |
| 2007/0080003 A1* | 4/2007 | Koerlin et al. | 180/65.1 |
| 2010/0007104 A1* | 1/2010 | Bennett | 280/7.15 |
| 2010/0318195 A1* | 12/2010 | Kettwig et al. | 623/36 |

* cited by examiner

*Primary Examiner* — Hau Phan
*Assistant Examiner* — Bryan Evans
(74) *Attorney, Agent, or Firm* — Ruth Eure

(57) ABSTRACT

The invention provides a motorized portable mobility device configured expressly for use by those who have undergone leg amputation. A generally rectangular wheeled base platform with a U shaped niche positioned on the rear of the device easily traverses both carpeted and solid flooring. A circular rotating plate enables a user to quickly adjust directional positioning. Two feet and adjustable height legs terminating in integrated support socks are mounted to the rotating plate. Adjustable height vertical supports terminating in handles and having a horizontal cross member are mounted to the front of the device. A control panel is mounted to a handle.

9 Claims, 2 Drawing Sheets

PROSTHETIC AID

CLAIM OF PRIORITY

This patent application claims priority under 35 USC 119 (e) (1) from U.S. Provisional Patent Application Ser. No. 61/688,185 filed May 9, 2012, of common inventorship herewith entitled, "Prosthetic Aid."

FIELD OF THE INVENTION

The present invention pertains to the field of prosthetic aids, and more specifically to the field of ambulatory device leg amputees.

BACKGROUND OF THE INVENTION

The prior art has put forth several designs for prosthetic aids. Among these are:

U.S. Pat. No. 4,547,913 to Van L. Phillips describes a composite prosthetic foot and leg which allows a high degree of mobility on the part of an amputee. The prosthetic foot and leg utilizes a resin impregnated high strength filament structure for the leg portion, the foot portion and heel portion, with all three regions being provided with substantial elastic flexibility, preferably of relatively low energy absorption characteristics so as to give the wearer high mobility with a relatively natural feel. All three portions of the prosthetic foot and leg are rigidly joined, with a flexibility of the leg portion providing flexibility of the leg in response to both torques about the ankle as well as about a vertical axis while simultaneously providing sidewise rigidity of the structure.

U.S. Pat. No. 6,436,149 to Richard G. Rincoe describes a prosthetic device having a proximal end portion adapted to be secured to an amputee and a distal foot structure. The improvement comprises a pivoting ankle joint disposed between the proximal end portion and the foot structure. This ankle joint includes a matable socket and head assembly interconnecting the proximal end portion and the foot structure for relative movement about a pivot axis between first and second positions. A spring element operates to resiliently bias the socket and head into the first pivot position. A load sensitive locking mechanism operates, upon the existence of a triggering load which exceeds a predetermined threshold magnitude, to cause the socket and head assembly to lock at a selected locking position, thereby preventing relative pivotal movement. In the absence of the triggering load, relative pivotal movement of the socket and head assembly between the first and second positions is permitted.

U.S. Pat. No. 6,652,596 to Mark W. L. Smith and Elcia H. Thompson describes a suspension aid for appending an above knee prosthesis to a human body. The suspension aid is integrally formed of a resilient fabric having a warp knit leno, or equivalent, construction. The belt portion of the suspension aid extends substantially horizontally around the intertrochanteric region of the pelvis.

None of these prior art references describe the present invention.

SUMMARY OF THE INVENTION

It is an object of the present invention to provide a portable mobility device for leg amputees.

DETAILED DESCRIPTION OF THE INVENTION

Figure 2:
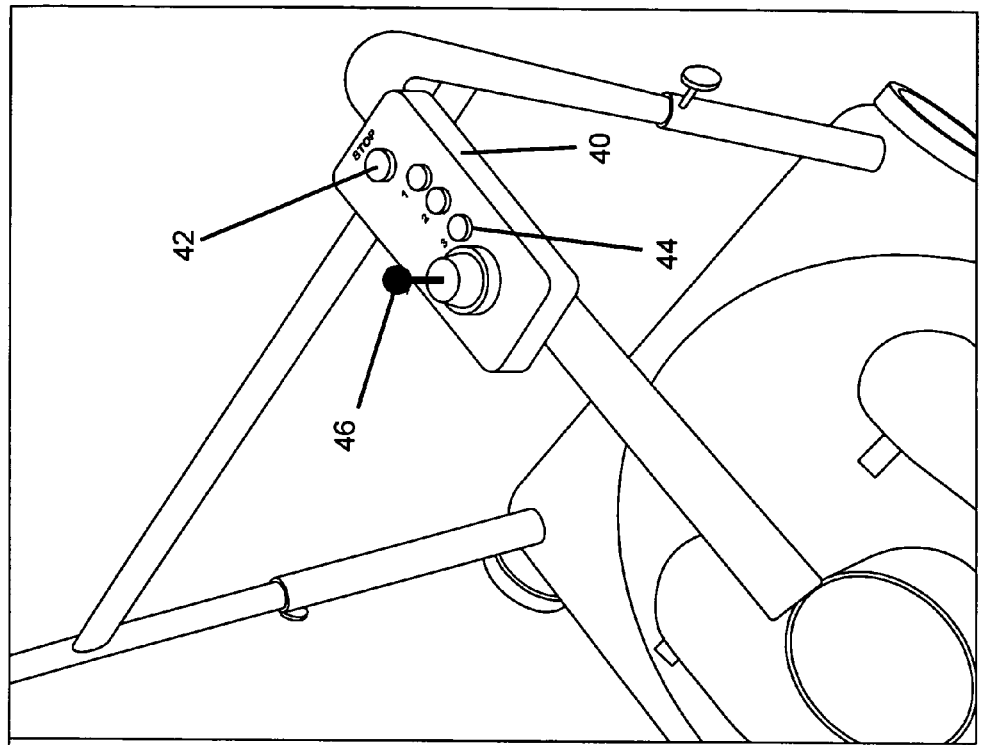
FIG. 2 is a prototypical close up top showing a control panel on the right handle with a joy stick controller, an emergency stop button and three variable speed buttons and rotation button.

The removal of a body extremity by trauma or surgery is known as amputation. A surgical measure, amputation is used to control pain or contain a disease process in the affected limb such as malignancy or gangrene. In some cases, amputation is carried out on individuals as a preventing surgery for such problems. In the case of below the knee amputation or BKA, the lower leg may be removed for any number of reasons. If blood circulating down one's leg is insufficient to keep their foot or toes alive, the limb may have to be removed. This lack of a flowing blood supply causes severe pain and allows serious infection to take hold. Often the only choice for medical professionals is to remove a damaged limb below one's knee or otherwise risk losing an entire leg. After a lower leg has been amputated, a scheduled course of physical therapy is necessary to learn how to adapt to the loss as well as optimally function without the limb. Perhaps one of the most difficult things to adjust to after a leg amputation is the loss of freedom of mobility. While prosthetic devices are comfortably employed during the waking hours, most amputees remove their prosthetics when retiring for the evening. Unfortunately, if an amputee wakes during the night to use the restroom or get a glass of water, doing so requires they apply their prosthetic limbs which is a time consuming process wherein the user applies a specially designed circulation sock over the amputated limb as well as a rubber or latex holder which conforms to the shape of the actual prosthetic and then secures a prosthetic over the stump. The time it takes to don a prosthetic is almost unbearable and accidents sometimes occur, especially if one suffers bladder control issues. The time and effort it takes to don prosthetics may result in one becoming overly awake which makes falling back asleep difficult. Many people solve this problem by keeping a wheelchair on hand to get around their home without first donning their prosthetic limbs. Others opt to utilize bed side urinals as a means of quickly relieving themselves during the evening hours. Wheelchairs take up a great deal of space and manual versions are difficult to operate, particularly if one is in poor physical shape or using the wheelchair on a carpeted surface. While use of a bed side urinal enables consumers to relieve their bladders during the middle of the night, these devices are unsanitary and sometimes difficult to utilize, especially by females. Further, these devices do little good if one wishes to retrieve a blanket from a closet, or quench their thirst in the middle of the night.

The present invention, hereinafter referred to as Prosthetic Aid, is a portable mobility device configured expressly for use by those who have undergone leg amputation. The Prosthetic Aid is designed to provide amputees with a simple way to move about their home without requiring them to don their prosthetic appliances. The Prosthetic Aid is easily employed and only takes up a fraction of the space of a standard wheelchair. A motorized unit, the Prosthetic Aid accommodates single or double leg amputees and is fully adjustable and customizable to the height, stature and amputation of individual users.

Figure 1:
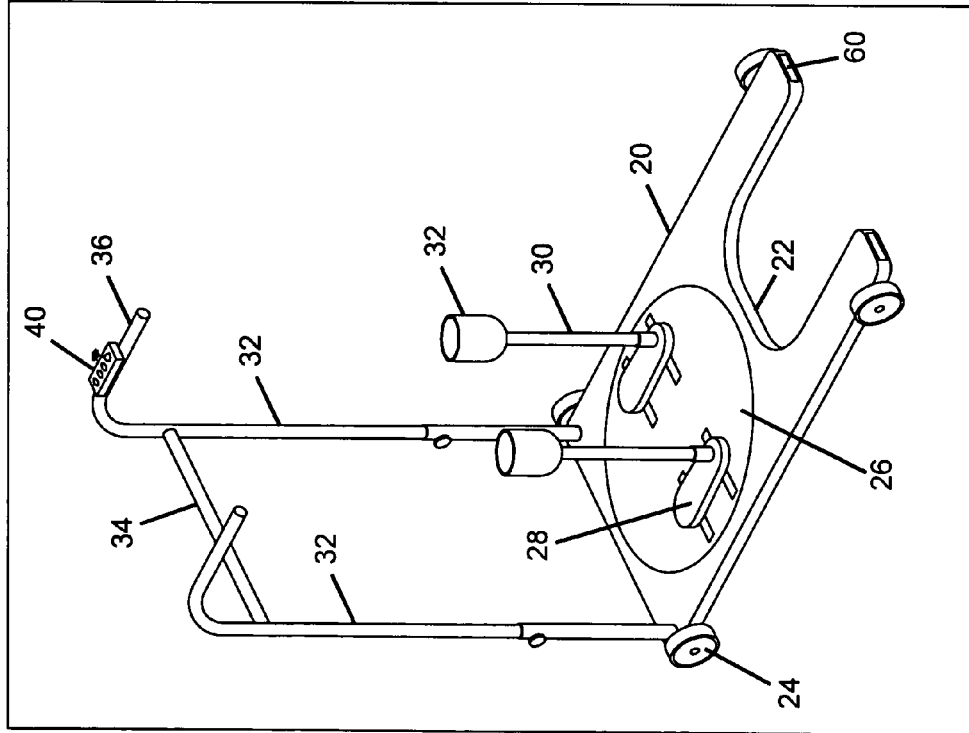
FIG. 1 is a prototypical top diagonal view showing height adjusters for handles, inflatable socks or silicons, height adjustable hydraulic permanent artificial legs, a rotatable three hundred sixty degree stand and illuminating front and rear lights.
Figure 4:
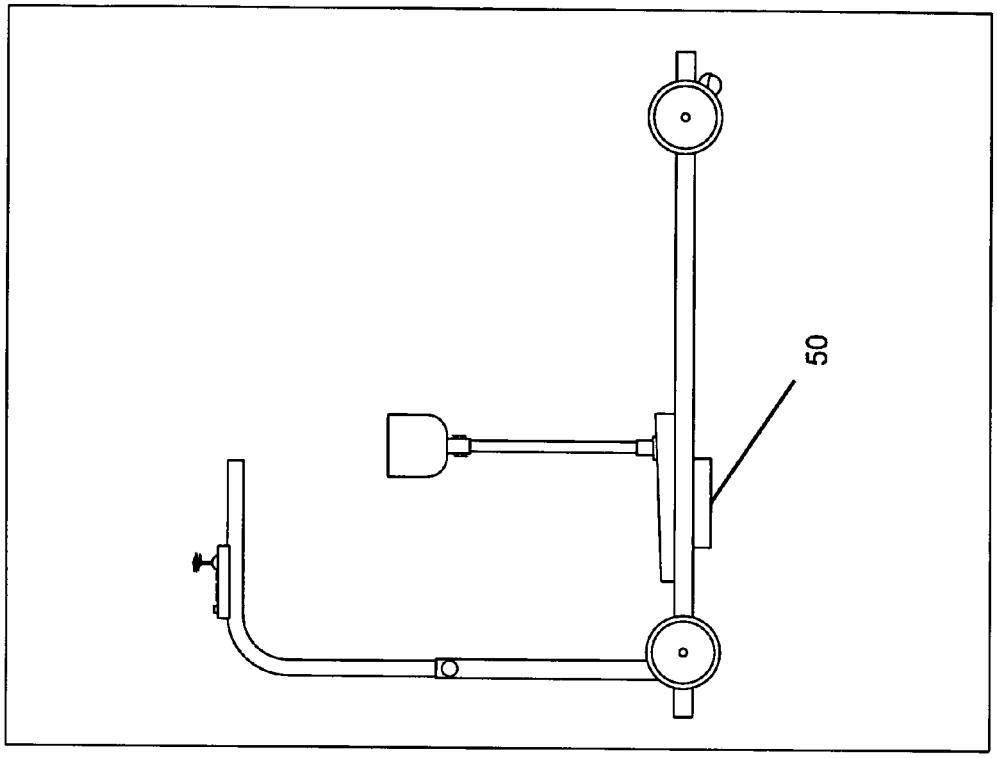
FIG. 4 is a prototypical side view showing wheels and a lower platform in which a motor and battery are stored.
Figure 3:
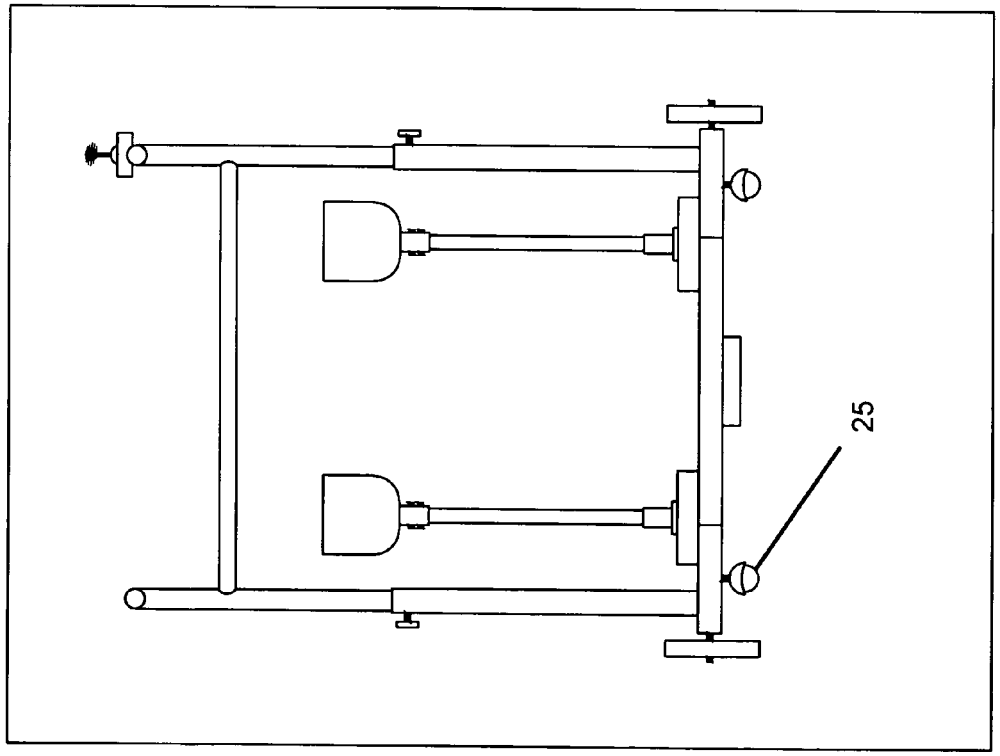
FIG. 3 is a prototypical back inside view showing a safety bar, a lower platform in which a battery is stored, and safety wheels in front and back.

Turning to FIG. 1, the base platform 20 of the unit is generally rectangular in shape with a U shaped niche 22 positioned on the rear of the device. Positioned near the corners of this base are four heavy duty wheeled castors or wheels 24 featuring a heavy tread that easily traverses both carpeted and solid flooring. These wheels 24 move forward and back as well as make both left and right turns. A circular rotating plate 26 positioned atop the base platform 20 rotates approximately three hundred sixty degrees, enabling a user to quickly adjust their directional positioning when standing atop the Prosthetic Aid. This rotating plate includes a sliding function that enables the user to move the plate forward or back. The forward and back sliding function is not shown. Positioned on each side of the center of the rotating plate 24 are two sturdy feet 28, on top of which fully adjustable vertical legs 30 with integrated support sockets 32 are positioned, inside of which the user inserts their amputated stump. These sockets 32 are cushiony silicone material or an inflatable sock, enabling the user to customize the socket to conform to the size and shape of their own stump. The legs 30 are fully adjustable, enabling the user to raise or lower one or both to accommodate the position of their amputation. On each side of the front of the Prosthetic Aid are two fully adjustable vertical support bars 32 joined together with a horizontal support 34. These vertical support bars 32 are easily raised or lowered to accommodate the height and stature of the user with the top of each support bar 32 culminating in a perpendicularly attached handle 36. The Prosthetic Aid handles 36 include sturdy nonskid grips, facilitating a firm hold during use.

Please refer to FIG. 2. Dependent on the user's dominant hand, operational control panel 40 is mounted on the right or left handle 36. This control panel 40 contains a Stop button 42, an emergency brake and push button settings that control the directional movement of the unit. The Prosthetic Aid has three speed settings 44 as well as individual controls for various adjustable components. A joy stick controller 46 controls the direction of movement of the device. The present invention is motorized with the motor 50 being housed in a housing in the base platform 20 along with a rechargeable battery pack. A standard one hundred ten volt sixty hertz power cord is included along with an adapter mechanism for use in charging the battery pack as needed. In an embodiment, the cord for recharging the battery can be stored in a compartment housed under the platform base 20.

To facilitate ease of use at night or in darkened environments, the Prosthetic Aid has a series of shatterproof lights 60 around its base.

Additional safety wheels 25 are mounted on the underside of base platform 20 to stabilize the device, if necessary.

Use of the Prosthetic Aid is simple and straight forward. The user purchases a single or double leg version of the Prosthetic Aid. Utilizing the control panel located on the top of the handlebar, the user adjusts various components of the Prosthetic Aid to accommodate their own physical stature and amputations. A double amputee who has an above the knee amputation on one leg and a below the knee amputation on the other leg adjusts the height of the right and left legs and sockets accordingly. The unit handlebars are raised or lowered to facilitate ease of use from a seated or standing position. These adjustment settings are permanently programmed and locked into place or the user may make minor adjustments as deemed necessary during use. To utilize the Prosthetic Aid, the user positions the unit beside their chair or bed and inserts their stumps into the leg sockets. The user then adjusts the silicone or inflatable socks around their stumps for a comfortable and secure fit. Standing upright, the user operates the present invention as desired, moving forward, backwards or making left or right handed turns. If utilizing a facility, a user positions the Prosthetic Aid to face the toilet at which point they rotate the actual base plate so their body is turned in the proper direction extending the plate outward from the base unit and they may easily and comfortably take their place atop the toilet seat. After use, the user is maneuvers the Prosthetic Aid alongside their bed so they can comfortably climb out of the sockets and straight into bed, unassisted. The device is then turned off and left in place until again needed.

The Prosthetic Aid provides amputees with an easily operable mobility tool which is quickly employed in the middle of the night or whenever one wishes to take a break from wearing their prosthetic limbs. A practical alternative to the time consuming task of applying prosthetic appliances, the Prosthetic Aid proves especially useful in the middle of the night when one wakens to use the facilities, quench their thirst or adjust the thermostat. By simply stepping into the Prosthetic Aid's adjustable leg sockets and powering the unit, a user easily goes to the bathroom or performs other personal chores unassisted, moving about their home with ease. Eliminating the need to ask a partner or loved one for help, the Prosthetic Aid enables a leg amputee to enjoy a measure of independence associated with doing things for themselves. By enabling a user to handle such personal needs as using the restroom, the need for unsightly and unsanitary bedside urinals effectively is eliminated. The Prosthetic Aid is most useful in an emergency situation such as a fire or tornado when one needs to evacuate the premises quickly. Compact in design, the sleek Prosthetic Aid takes up minimal space in the home, offering a user friendly alternative to bulky wheelchairs that may be difficult to operate. Motor driven and maneuvered with simple controls, the Prosthetic Aid is easily employed by any consumer regardless of age or dexterity. Ideal for general household use, the Prosthetic Aid also is an invaluable commodity in nursing homes and assisted living facilities, providing patients the freedom of caring for their own basic needs while freeing up time for nursing and support staff to dedicate to other more pressing matters. Durably constructed, this cleverly designed mobility device will withstand years of continued use.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A portable motorized mobility device for leg amputees, comprising: a generally rectangular platform base having a U shaped niche positioned on the rear of the device; further comprising four wheeled castors or wheels positioned near the corners of the platform base, further comprising a circular rotating plate positioned atop the base platform, wherein the circular rotating plate rotates approximately three hundred sixty degrees, enabling a user to stand upright and quickly adjust their directional positioning; further comprising, two sturdy feet positioned on each side of the center of the rotating plate, further comprising two height adjustable vertical legs mounted on top of the feet and perpendicular to the feet, further comprising integrated support sockets mounted on top of the vertical legs, inside of which the user inserts their amputated stump, further comprising two fully height adjustable vertical support bars joined together with a horizontal support, wherein the top of each support bar terminates in a perpendicularly attached handle and wherein the vertical support bars are mounted near the front of the device, further comprising an operational control panel mounted on a handle; further comprising a motor mounted to the base platform.

2. The portable motorized mobility device for leg amputees of claim 1 wherein the wheels move forward and back and can make both left and right turns.

3. The portable motorized mobility device for leg amputees of claim 1 wherein the rotating plate includes a sliding function that enables the user to move the plate forward or back.

4. The portable motorized mobility device for leg amputees of claim 1 wherein the handles include sturdy nonskid grips, facilitating a firm hold during use.

5. The portable motorized mobility device for leg amputees of claim 1 wherein the control panel can be mounted to the right or left handle.

6. The portable motorized mobility device for leg amputees of claim 5, wherein the control panel further comprises a joy stick controller for controlling the direction of movement of the device.

7. The portable motorized mobility device for leg amputees of claim 1, wherein the motor is housed in a housing in the base platform.

8. The portable motorized mobility device for leg amputees of claim 7, further comprising a rechargeable battery pack mounted in the base platform.

9. The portable motorized mobility device for leg amputees of claim 1, further comprising additional safety wheels mounted on the underside of base platform to stabilize the device.

* * * * *